United States Patent
Chen et al.

(10) Patent No.: US 11,814,077 B2
(45) Date of Patent: Nov. 14, 2023

(54) METHOD AND APPARATUS FOR STORING AUTONOMOUS DRIVING TEST DATA AND ELECTRONIC DEVICE

(71) Applicant: BEIJING BAIDU NETCOM SCIENCE AND TECHNOLOGY CO., LTD., Beijing (CN)

(72) Inventors: Kexin Chen, Beijing (CN); He Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 344 days.

(21) Appl. No.: 17/215,643

(22) Filed: Mar. 29, 2021

(65) Prior Publication Data

US 2021/0229699 A1 Jul. 29, 2021

(30) Foreign Application Priority Data

Jun. 10, 2020 (CN) .......................... 202010524870.4

(51) Int. Cl.
*G06F 11/34* (2006.01)
*B60W 60/00* (2020.01)
(Continued)

(52) U.S. Cl.
CPC ....... *B60W 60/0011* (2020.02); *G06F 9/5077* (2013.01); *G06F 11/3476* (2013.01); *G07C 5/085* (2013.01); *G06F 11/3013* (2013.01)

(58) Field of Classification Search
CPC .... G06F 11/3476; G06F 9/5077; G07C 5/085
(Continued)

(56) References Cited

U.S. PATENT DOCUMENTS

2018/0094415 A1* 4/2018 Slate ................... G01M 3/2815
2018/0237027 A1* 8/2018 Lundsgaard ...... B60W 50/0098
(Continued)

FOREIGN PATENT DOCUMENTS

CN 106406760 A 2/2017
CN 107545616 A 1/2018
(Continued)

OTHER PUBLICATIONS

European Search Report dated Oct. 7, 2021 of the corresponding European Patent Application No. 21165824.0 (nine pages).

*Primary Examiner* — Chae M Ko
(74) *Attorney, Agent, or Firm* — Kilpatrick Townsend & Stockton LLP

(57) ABSTRACT

A method and apparatus for storing autonomous driving test data and an electronic device are provided. The method may include: acquiring a task type of a test task of an autonomous vehicle; receiving message data acquired in a test of the autonomous vehicle and corresponding to the task type, and writing the message data into a data queue; creating a log file corresponding to the task type, writing the message data corresponding to the task type in the data queue into the log file, and transferring the log file and a file name of the log file to the data queue; acquiring preset disk drop scenario information corresponding to the task type; and adding, according to the preset disk drop scenario information, an unclearable mark to the log file in the data queue having data acquisition time consistent with the time of triggering disk drop storage of data.

12 Claims, 5 Drawing Sheets

(51) Int. Cl.
    *G06F 9/50*     (2006.01)
    *G07C 5/08*     (2006.01)
    *G06F 11/30*    (2006.01)

(58) Field of Classification Search
    USPC .......................................................... 714/45
    See application file for complete search history.

(56) References Cited

U.S. PATENT DOCUMENTS

| | | | |
|---|---|---|---|
| 2019/0340929 A1 | 11/2019 | Greenberger et al. | |
| 2020/0027292 A1* | 1/2020 | Watson ................ | G01M 17/007 |
| 2022/0091973 A1* | 3/2022 | Atmeh ................. | G06F 11/3692 |

FOREIGN PATENT DOCUMENTS

| | | | | |
|---|---|---|---|---|
| CN | 107885648 A | * | 4/2018 | .......... G06F 11/3692 |
| CN | 108961462 A | | 12/2018 | |
| CN | 109614054 A | | 4/2019 | |
| CN | 110322592 A | | 10/2019 | |
| CN | 110460653 A | | 11/2019 | |
| CN | 110473310 A | | 11/2019 | |
| CN | 111145382 A | | 5/2020 | |
| CN | 111178454 A | | 5/2020 | |

\* cited by examiner

METHOD AND APPARATUS FOR STORING AUTONOMOUS DRIVING TEST DATA AND ELECTRONIC DEVICE

CROSS-REFERENCE TO RELATED APPLICATIONS

This application claims priority to Chinese Application No. 202010524870.4, filed on Jun. 10, 2020 and entitled "Method and Apparatus for Storing Autonomous Driving Test Data and Electronic Device," the content of which is hereby incorporated by reference in its entirety.

TECHNICAL FIELD

Embodiments of the present disclosure relate to the field of computer technology, specifically to the field of autonomous driving, and more specifically to a method and apparatus for storing autonomous driving test data, an electronic device and a computer readable storage medium.

BACKGROUND

Vehicle state data of autonomous vehicles during driving, and information data acquired by various positioning apparatuses, radars, cameras and other sensors need to be logged in time and stored to disks. The information data dropped to the disks is mainly used for problem reproduction in off-line environments, bug positioning and troubleshooting, and acquisition of high-precision maps. The accumulated data may also be used for simulation.

According to different scenarios of test tasks of autonomous vehicles or different types of acquired data, the test tasks of the autonomous vehicles may be divided into many different task types. The current test method uses the same method of dropping data to disks for different test task types, and a large amount of repeated data irrelevant to the test tasks is acquired accordingly, which wastes disk resources, is also not conducive to extracting data relevant to the test tasks by developers and testers from a large amount of disk drop data, and increases the time cost of the test.

SUMMARY

A method and apparatus for storing autonomous driving test data, an electronic device and a computer readable storage medium are provided.

In a first aspect, an embodiment of the present disclosure provides a method for storing autonomous driving test data, the method including: acquiring a task type of a test task of an autonomous vehicle; receiving message data acquired in a test of the autonomous vehicle and corresponding to the task type, and writing the message data into a data queue; creating a log file corresponding to the task type, writing the message data corresponding to the task type in the data queue into the log file, and transferring the log file and a file name of the log file to the data queue; acquiring preset disk drop scenario information corresponding to the task type of the test task of the autonomous vehicle, the preset disk drop scenario information representing a time of triggering disk drop storage of data; and adding, according to the preset disk drop scenario information corresponding to the task type of the test task of the autonomous vehicle, an unclearable mark to the log file in the data queue having data acquisition time consistent with the time of triggering disk drop storage of data.

In a second aspect, an embodiment of the present disclosure provides an apparatus for storing autonomous driving test data, the apparatus including: a first acquiring unit, configured to acquire a task type of a test task of an autonomous vehicle; a receiving unit, configured to receive message data acquired in a test of the autonomous vehicle and corresponding to the task type, and write the message data into a data queue; a writing unit, configured to create a log file corresponding to the task type, write the message data corresponding to the task type in the data queue into the log file, and transfer the log file and a file name of the log file to the data queue; a second acquiring unit, configured to acquire preset disk drop scenario information corresponding to the task type of the test task of the autonomous vehicle, the preset disk drop scenario information representing a time of triggering disk drop storage of data; and a marking unit, configured to add, according to the preset disk drop scenario information corresponding to the task type of the test task of the autonomous vehicle, an unclearable mark to the log file in the data queue having data acquisition time consistent with the time of triggering disk drop storage of data.

In a third aspect, an embodiment of the present disclosure provides an electronic device, the device electronic including: at least one processor; and a memory communicatively connected with the at least one processor, the memory storing instructions executable by the at least one processor, and the instructions, when executed by the at least one processor, causing the at least one processor to perform the method according to the first aspect.

In a fourth aspect, an embodiment of the present disclosure provides a non-transitory computer readable storage medium storing computer instructions, the computer instructions being used to cause a computer to perform the method according to the first aspect.

It should be understood that the content described in this section is neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

The accompanying drawings are used to better understand the solution and do not constitute limitations to the present disclosure.

DETAILED DESCRIPTION OF EMBODIMENTS

Example embodiments of the present disclosure are described below with reference to the accompanying drawings, including various details of embodiments of the present disclosure to contribute to understanding, which should be considered merely as examples. Therefore, those of ordinary skills in the art should realize that various alterations and modifications can be made to embodiments described here without departing from the scope and spirit of the present disclosure. Similarly, for clarity and conciseness, descriptions of well-known functions and structures are omitted in the following description.

It should also be noted that some embodiments in the present disclosure and some features in the disclosure may be combined with each other on a non-conflict basis. Features of the present disclosure will be described below in detail with reference to the accompanying drawings and in combination with embodiments.

The technology according to embodiments of the present disclosure solves the problems that the existing method for storing data acquires a large amount of repeated data irrelevant to the test tasks, which wastes disk resources, is also not conducive to extracting data relevant to the test tasks by developers and testers from a large amount of disk drop data, and increases the time cost of the test.

Figure 1:
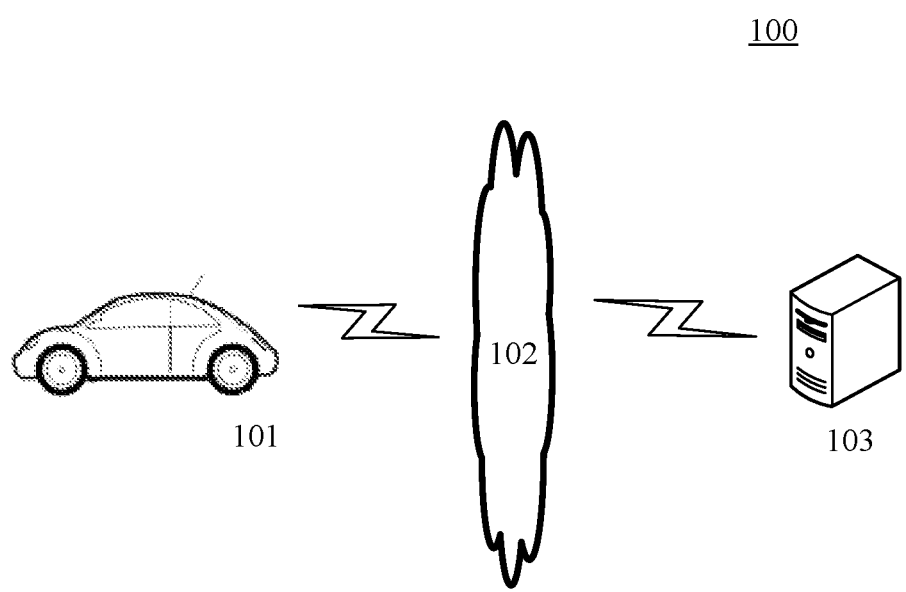
FIG. 1 is a diagram of an example system architecture in which embodiments of the present disclosure may be implemented.

FIG. 1 shows an example system architecture 100 in which a method for storing data or an apparatus for storing data according to embodiments of the present disclosure may be implemented.

As shown in FIG. 1, the example system architecture 100 may include an autonomous vehicle 101, a network 102 and a server 103. The network 102 serves as a medium providing a communication link between the autonomous vehicle 101 and the server 103. The network 102 may include various types of connections, such as wired or wireless communication links, or optical fiber cables.

The autonomous vehicle 101 may interact with the server 103 through the network 102 to receive or send signals. The autonomous vehicle 101 may be installed with various electronic apparatuses, such as a camera, a sensor, a lidar, a navigation apparatus, an autonomous vehicle controller, an anti-lock braking systems, and a braking force distribution system.

The autonomous vehicle 101 may be various autonomous vehicles, including but not limited to a large bus, a tractor, a city bus, a medium bus, a large truck, a compact car, a small automatic transmission car, an autonomous vehicle or other intelligent autonomous vehicles.

The server 103 may be a server providing various services, for example, a backend server providing data storage support for the autonomous vehicle 101. The backend server may receive test message data sent by the autonomous vehicle 101, and then store the information according to the preset disk drop scenario information corresponding to the task type of the test task of the autonomous vehicle.

It should be noted that the method for storing autonomous driving test data according to embodiments of the present disclosure is generally executed by the server 103. Accordingly, the apparatus for storing autonomous driving test data is generally provided in the server 103.

It should be understood that numbers of the autonomous vehicle, the network and the server in FIG. 1 are merely illustrative. According to implementation needs, there may be any number of autonomous vehicles, networks and servers.

Figure 2:
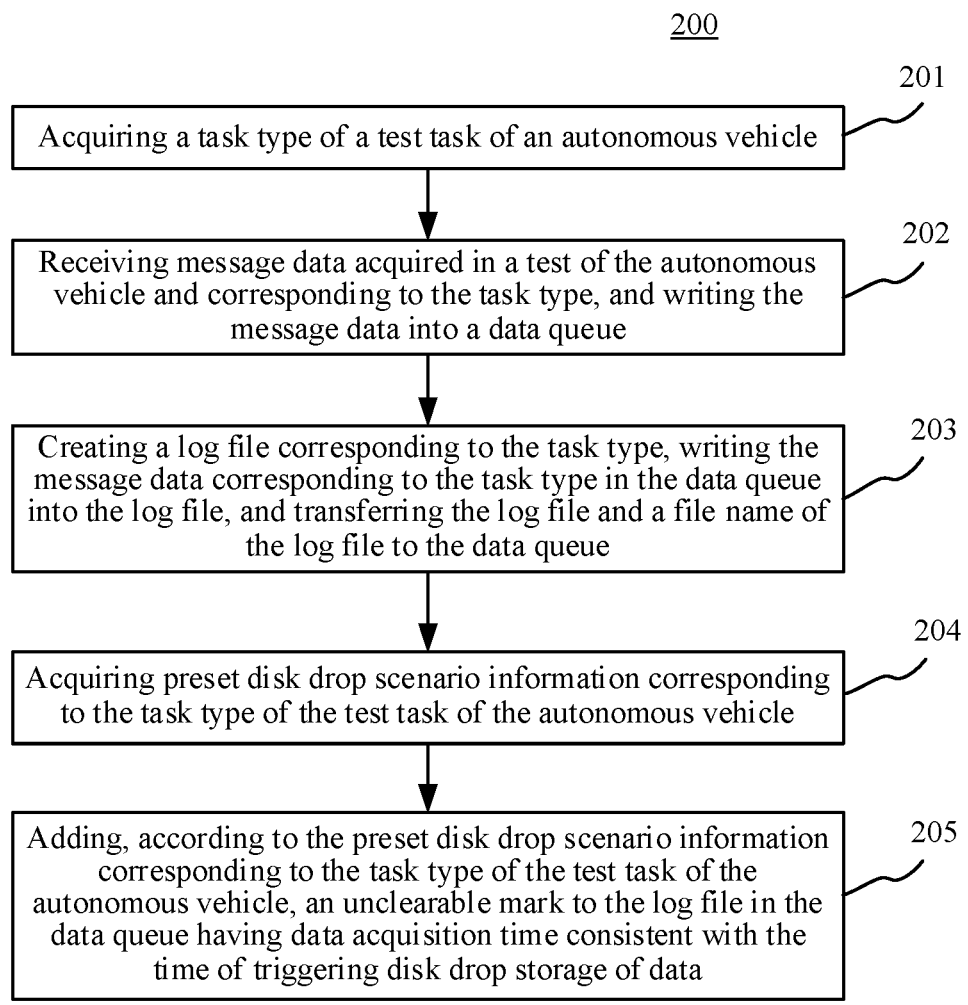
FIG. 2 is a flowchart of a method for storing autonomous driving test data according to an embodiment of the present disclosure.

Continuing to referring to FIG. 2, a flow 200 of a method for storing autonomous driving test data according to an embodiment of the present disclosure is shown. The method for storing data in this embodiment includes the following steps.

Step 201: acquiring a task type of a test task of an autonomous vehicle.

In this embodiment, the executing body (for example, the server 103 shown in FIG. 1) of the method for storing data may acquire the task type of the test task of the autonomous vehicle. The executing body may acquire the task type of the test task of the autonomous vehicle from another electronic device, or may acquire the task type of the test task of the autonomous vehicle locally from the executing body. The executing body may receive the task type selected by a user through a visual operation platform.

The task type of the test task of the autonomous vehicle includes: a module test task, a road test and road running task, a map acquisition task, or the like. The task type of the module test task may be further subdivided in a plurality of levels according to different modules, such as a positioning task, a perception task, and a decision-making and control task.

Step 202: receiving message data acquired in a test of the autonomous vehicle and corresponding to the task type, and writing the message data into a data queue.

In this embodiment, after acquiring the task type of the test task of the autonomous vehicle, the executing body may receive the message data acquired in the test of the autonomous vehicle and corresponding to the task type, and write the message data into the data queue. The message data includes vehicle state data, vehicle control instruction data, data acquired by a sensor such as a positioning apparatus, a radar, or a camera. The data queue is preset by the executing body.

Different task types correspond to different message data. For example, the road test and road running task corresponds to road test data and road running data acquired, the positioning task corresponds to data acquired by a positioning sensor, the perception task corresponds to data acquired by a perception sensor, and the map acquisition task corresponds to data acquired by a camera and a lidar.

The data queue is a container used to store message data during the transmission of the message data, and may be a common data queue, such as ActiveMQ, RabbitMQ, Kafka, or RocketMQ, which is not specially limited in embodiments of the present disclosure.

Step 203: creating a log file corresponding to the task type, writing the message data corresponding to the task type in the data queue into the log file, and transferring the log file and a file name of the log file to the data queue.

In this embodiment, the executing body creates the log file corresponding to the task type, writes the message data corresponding to the task type in the data queue into the log file, and transfers the log file and the file name of the log file to the data queue.

Specifically, first, the log file is created and named according to the acquired task type of the test task of the autonomous vehicle, for example, a module test task file, a road test and road running task file, a map acquisition task file, a positioning task file, a perception task file, a decision-making and control task file, or the like is created; then, the data queue is searched for the message data corresponding to the task type, and the message data corresponding to the task type is written into the corresponding log file; and finally, the message data in the log file and the file name of the log file are transferred back to the data queue.

Further, the log file corresponding to the task type is created, the message data corresponding to the task type in the data queue is written into the log file, and a data acquisition time is transferred to the data queue.

Step 204: acquiring preset disk drop scenario information corresponding to the task type of the test task of the autonomous vehicle.

In this embodiment, after acquiring the task type of the test task of the autonomous vehicle, the executing body further acquires the preset disk drop scenario information corresponding to the task type of the test task of the autonomous vehicle. The preset disk drop scenario information includes a time of triggering disk drop storage of data. The preset disk drop scenario information includes whole-course disk drop, autonomous driving disk drop, and event trigger disk drop. The event trigger disk drop refers to a disk drop scenario triggered by a preset event. The preset event may include entry and exit of autonomous driving, emergency braking, emergency steering, and manually submitted events. When these events are triggered, data within a period of time before and after the trigger time is logged. The corresponding relationship between the task type and the preset disk drop scenario information may be pre-configured.

Step 205: adding, according to the preset disk drop scenario information corresponding to the task type of the test task of the autonomous vehicle, an unclearable mark to the log file in the data queue having data acquisition time consistent with the time of triggering disk drop storage of data.

In this embodiment, the executing body adds, according to the time of triggering disk drop storage of data in the preset disk drop scenario information corresponding to the task type of the test task of the autonomous vehicle, the unclearable mark to the log file in the data queue having the data acquisition time consistent with the time of triggering disk drop storage of data. That is, it can be determined whether the acquisition time of data in the log file in the data queue is consistent with the time of triggering disk drop storage of data in the preset disk drop scenario information, and if the acquisition time of data in the log file in the data queue is consistent with the time of triggering disk drop storage of data in the preset disk drop scenario information, then the unclearable mark is added to the log file.

Optionally, it can be determined whether the time point of writing the message data into the log file in the data queue is consistent with the time point of triggering disk drop storage of data in the preset disk drop scenario information, and if the time point of writing the message data into the log file in the data queue is consistent with the time point of triggering disk drop storage of data in the preset disk drop scenario information, then the unclearable mark is added to the log file.

For example, the preset disk drop scenario corresponding to the task type of the test task of the autonomous vehicle is an emergency braking event. When the emergency braking event is triggered, data within five minutes before and after the trigger time of the emergency braking event is logged, that is, the time of triggering disk drop storage of data includes five minutes before and after the trigger time of the emergency braking event. Therefore, the executing body adds, according to the time of triggering disk drop storage of data, the unclearable mark to the log file in the data queue having data acquisition time consistent with the time of triggering disk drop storage of data.

In some optional implementations of this embodiment, after step 205, the method further includes: polling the data and files in the data queue, and clearing the message data and the files having no unclearable mark in the data queue.

In this embodiment, the clearing thread of the executing body may periodically poll the data and files in the data queue, and clear the message data and the files having no unclearable mark in the data queue. In this way, the data irrelevant to the test task in the data queue can be cleared in time, and only the data with unclearable marks is retained, so that the tester can quickly acquire the data relevant to the test task.

The method for storing data according to embodiments of the present disclosure can store the data of the autonomous vehicle by using the task type of the test task of the autonomous vehicle and the corresponding disk drop scenario information, and can clear useless and repeated data, thereby saving disk resources.

Figure 3:
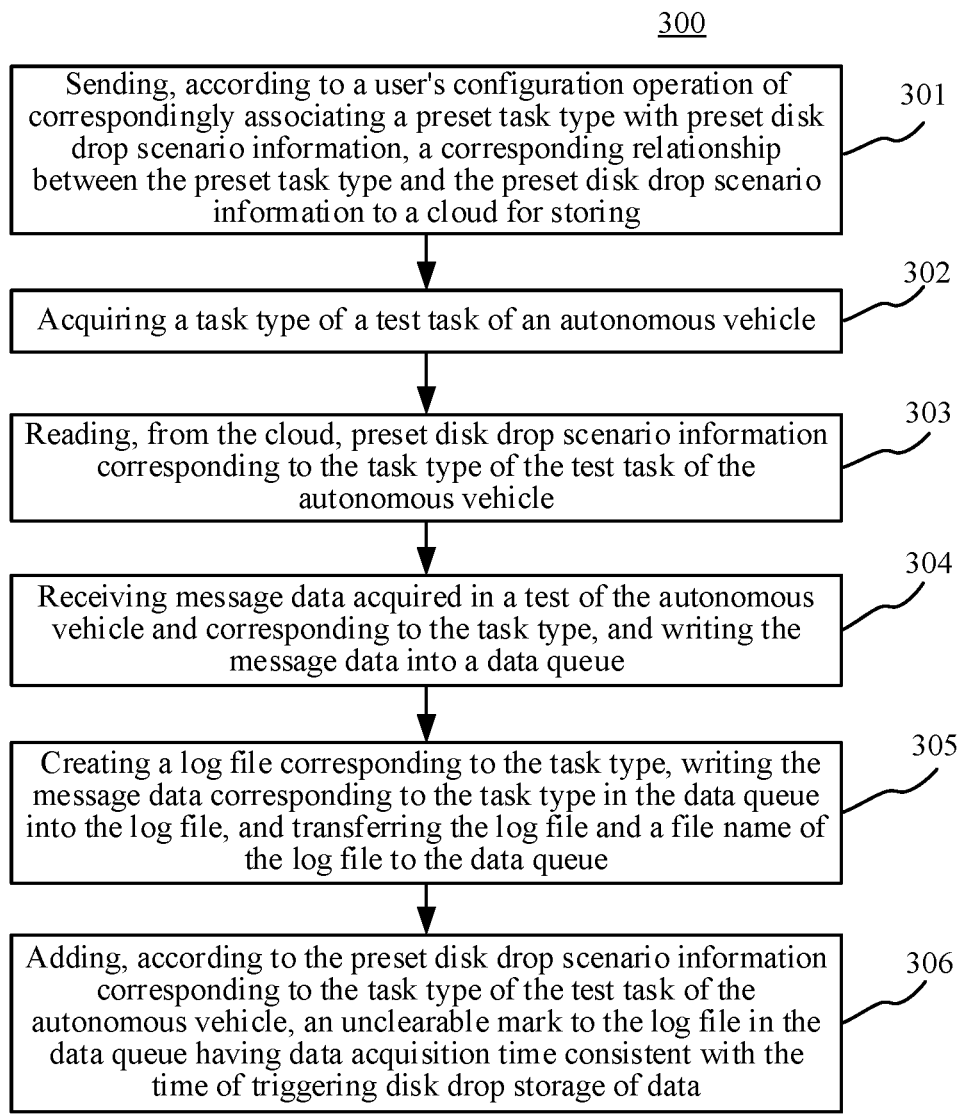
FIG. 3 is a flowchart of a method for storing autonomous driving test data according to another embodiment of the present disclosure.

Continuing to referring to FIG. 3, a flow 300 of a method for storing data according to another embodiment of the present disclosure is shown. As shown in FIG. 3, the method for storing autonomous driving test data of this embodiment may include the following steps.

Step 301: sending, according to a user's configuration operation of correspondingly associating a preset task type with preset disk drop scenario information, a corresponding relationship between the preset task type and the preset disk drop scenario information to a cloud for storing.

In this embodiment, the executing body sends, according to the configuration operation of correspondingly associating the preset task type with the preset disk drop scenario information by the user, the corresponding relationship between the preset task type and the preset disk drop scenario information to the cloud for storing. The configuration operation of correspondingly associating the preset task type with the preset disk drop scenario information may be customized and completed by a person skilled in the art. The flexible configuration of the association relationship between the test task and the disk drop scenario is thus achieved, so that the method of this embodiment can be applied to various test tasks.

For example, the person skilled in the art customizes that the module test corresponds to autonomous driving disk drop, the road test and road running task corresponds to event trigger disk drop, and the map acquisition task corresponding to whole-course disk drop.

In some optional implementations of this embodiment, first, the executing body pushes a data partitioning strategy to the user, for the user to select a preset task type of a preset test task according to test requirement information of the preset test task and the data required to be acquired for different task types. The data partitioning strategy includes message data of an autonomous vehicle required to be acquired under each task type, and the data partitioning strategy is determined according to the test task of the autonomous vehicle. Using the preset data partitioning strategy can help the user quickly complete the configuration of the association relationship between the task type and the disk drop scenario.

Then, according to the preset task type of the preset test task selected by the user, at least one piece of candidate disk drop scenario information that matches the task type is read from the cloud and pushed to the user; and the candidate disk drop scenario information selected by the user is used as the preset disk drop scenario information corresponding to the preset task type. Pre-configuring the matching relationship between various task types and candidate disk drop scenario information can reduce the difficulty of user configuration and improve configuration efficiency. In addition, the matching relationship between the task types in the cloud and at least one candidate disk drop scenario can be automatically extracted from the historical test process and saved, which can provide a rich and accurate matching relationship for the user to refer when configuring.

Finally, the corresponding relationship between the preset task type and the preset disk drop scenario information is sent to the cloud for storing.

In this embodiment, since the preset task type is correspondingly associated with the preset disk drop scenario information, only required message data under the preset disk drop scenario is acquired.

Step 302: acquiring a task type of a test task of an autonomous vehicle.

In this embodiment, the executing body (for example, the server 103 shown in FIG. 1) of the method for storing data may acquire the task type of the test task of the autonomous vehicle. The executing body may acquire the task type of the test task of the autonomous vehicle from another electronic device, or may acquire the task type of the test task of the autonomous vehicle locally from the executing body. The executing body may receive the task type selected by the user through a visual operation platform.

Step 303: reading, from the cloud, preset disk drop scenario information corresponding to the task type of the test task of the autonomous vehicle.

In this embodiment, specifically, based on the corresponding relationship between the preset task type and the preset disk drop scenario information stored in the cloud, the executing body reads, from the cloud, the preset disk drop scenario information corresponding to the task type of the test task of the autonomous vehicle.

Step 304: receiving message data acquired in a test of the autonomous vehicle and corresponding to the task type, and writing the message data into a data queue.

Step 305: creating a log file corresponding to the task type, writing the message data corresponding to the task type in the data queue into the log file, and transferring the log file and a file name of the log file to the data queue.

In this embodiment, the specific operations of steps 304 and 305 are substantially consistent with the operations of steps 202 and 203 in the embodiment shown in FIG. 2, so details are not described herein again.

Step 306: adding, according to the preset disk drop scenario information corresponding to the task type of the test task of the autonomous vehicle, an unclearable mark to the log file in the data queue having data acquisition time consistent with the time of triggering disk drop storage of data.

In this embodiment, the specific operation of step 306 is substantially consistent with the operation of step 205 in the embodiment shown in FIG. 2, so details are not described herein again.

In some optional implementations of this embodiment, after step 306, the method further includes: polling the data and files in the data queue, and clearing the message data and the files having no unclearable mark in the data queue.

In this embodiment, the clearing thread of the executing body polls the data and files in the data queue, and clears the message data and the files having no unclearable mark in the data queue.

Figure 4:
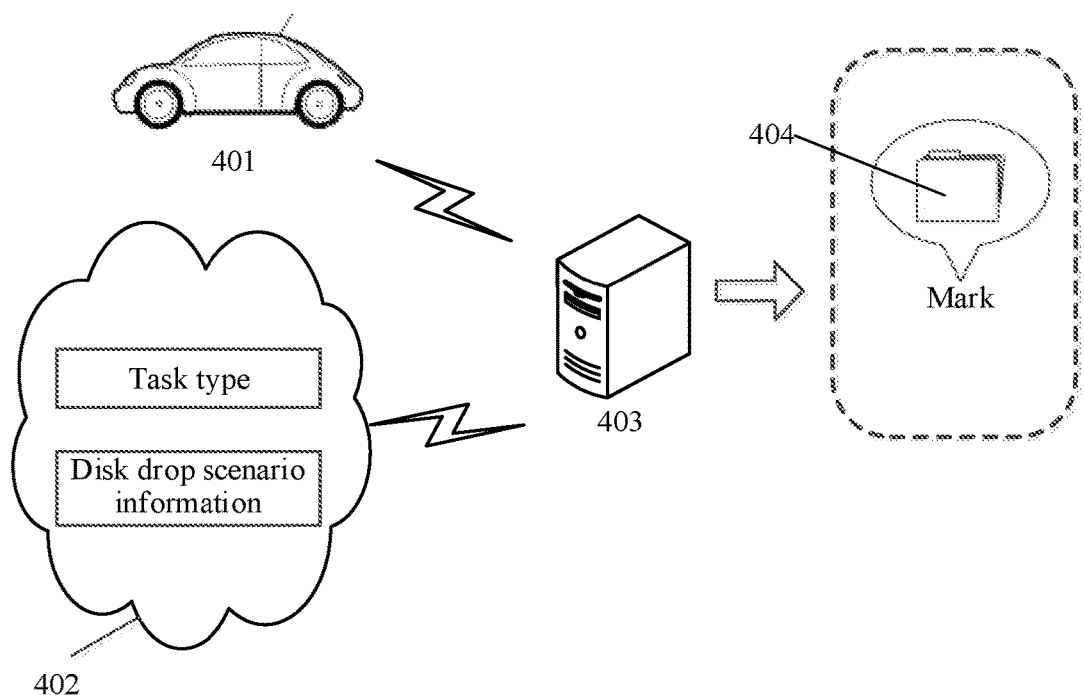
FIG. 4 is a schematic diagram of an application scenario of an embodiment shown in FIG. 3.

Continuing to referring to FIG. 4, FIG. 4 is a schematic diagram of an application scenario of the embodiment shown in FIG. 3. In the application scenario of FIG. 4, first, a server 403 acquires, from a cloud 402, a task type of a test task of an autonomous vehicle 401 and preset disk drop scenario information corresponding to the task type of the test task of the autonomous vehicle 401. Then, the server 403 receives message data acquired in a test of the autonomous vehicle 401 and corresponding to the task type, and writes the message data into a data queue. Then, the server 403 creates a log file 404 corresponding to the task type, writes the message data corresponding to the task type in the data queue into the log file 404, and transfers the log file 404 and a file name of the log file 404 to the data queue. Finally, the server 403 adds, according to the preset disk drop scenario information corresponding to the task type of the test task of the autonomous vehicle 401, an unclearable mark to the log file 404 in the data queue having data acquisition time consistent with the time of triggering disk drop storage of data; and polls the data and files in the data queue, and clears the message data and the files having no unclearable mark in the data queue.

The method for storing data according to embodiments of the present disclosure can store the data of the autonomous vehicle by using the task type of the test task of the autonomous vehicle and the corresponding disk drop scenario information, and can clear useless and repeated data, thereby shortening test time and saving disk resources.

Figure 5:
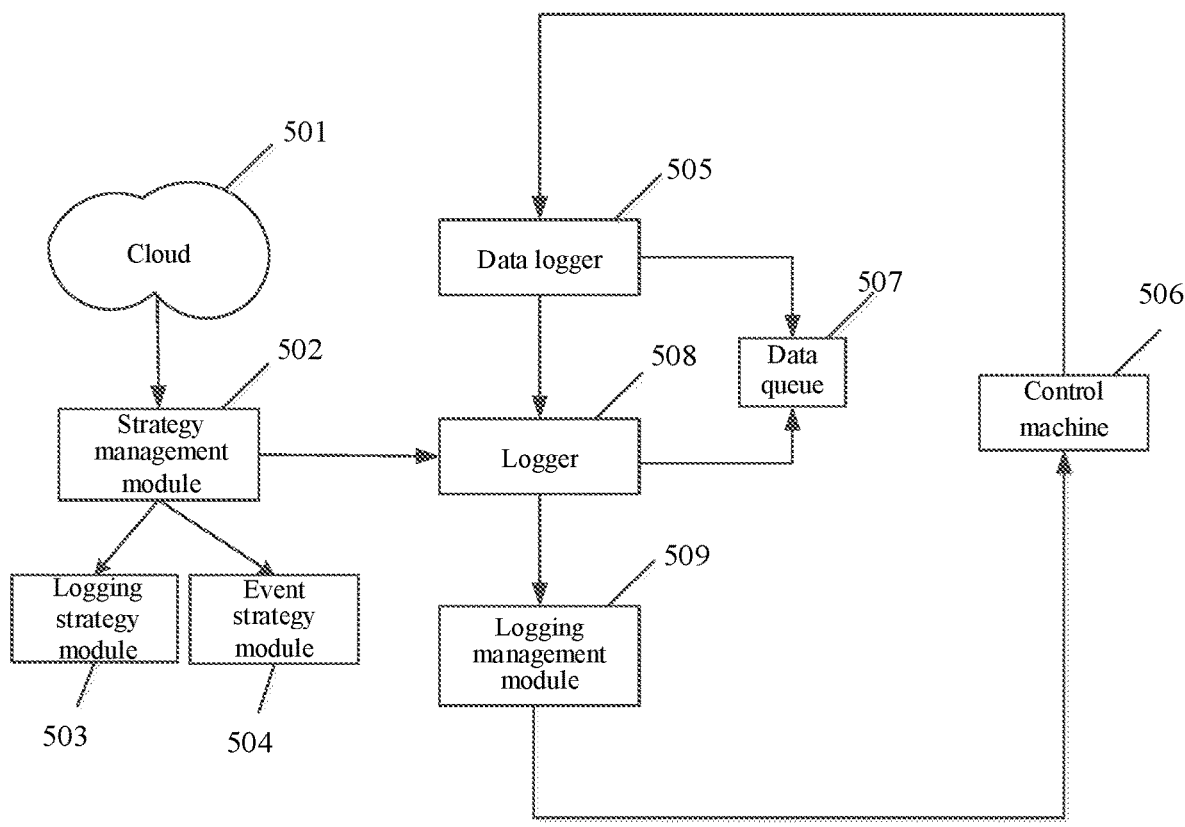
FIG. 5 is a schematic diagram of a backend implementation of a method for storing autonomous driving test data according to an embodiment of the present disclosure.

Continuing to referring to FIG. 5, FIG. 5 is a schematic diagram of a backend implementation of a method for storing autonomous driving test data according to an embodiment of the present disclosure. A strategy management module 502 acquires a data partitioning strategy from a cloud 501, and the strategy management module 502 calls a logging strategy module 503 to write a task type, and calls an event strategy module 504 to write a disk drop scenario corresponding to the test task; and a data logger 505 receives message data called back from a control machine 506, writes the message data into a data queue 507, and then informs a logger 508 to read the message data. Here, the message data is test data acquired during the test. The logger 508 detects the task type by calling the logging strategy module 503, creates a log file corresponding to the task type, writes the message data corresponding to the task type in the data queue 507 into the log file, and transfers the log file and a file name of the log file to the data queue 507. The logger 508 acquires the disk drop scenario corresponding to the task type; and informs, according to the disk drop scenario corresponding to the task type, a logging management module 509 to add an unclearable mark to the log file in the data queue 507 having data acquisition time consistent with the time of triggering disk drop storage of data.

Figure 6:
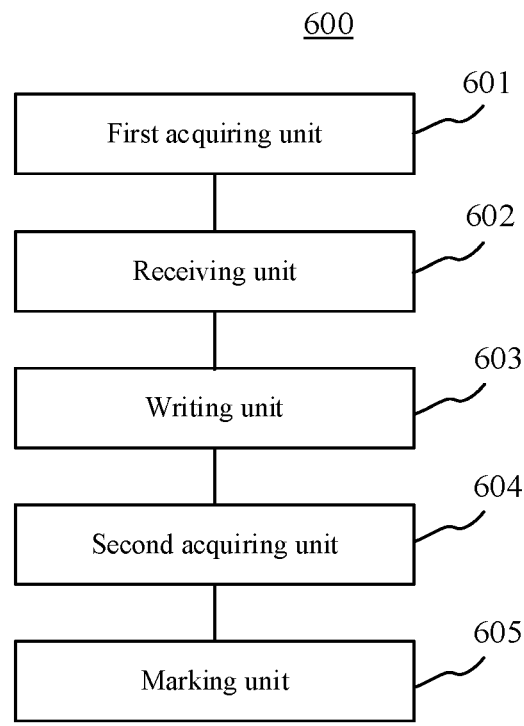
FIG. 6 is a schematic structural diagram of an apparatus for storing autonomous driving test data for implementing embodiments of the present disclosure.

Further referring to FIG. 6, as an implementation of the methods shown in the above figures, an embodiment of the present disclosure provides an apparatus for storing autonomous driving test data. The embodiment of the apparatus may correspond to the embodiment of the method shown in FIG. 2, and the apparatus may be applied to various electronic devices.

As shown in FIG. 6, an apparatus 600 for storing autonomous driving test data in this embodiment includes: a first acquiring unit 601, a receiving unit 602, a writing unit 603, a second acquiring unit 604, and a marking unit 605.

The first acquiring unit 601 is configured to acquire a task type of a test task of an autonomous vehicle; the receiving unit 602 is configured to receive message data acquired in a test of the autonomous vehicle and corresponding to the task type, and write the message data into a data queue; the writing unit 603 is configured to create a log file corresponding to the task type, write the message data corresponding to the task type in the data queue into the log file, and transfer the log file and a file name of the log file to the data queue; the second acquiring unit 604 is configured to acquire preset disk drop scenario information corresponding to the task type of the test task of the autonomous vehicle, the preset disk drop scenario information representing a time of triggering disk drop storage of data; and the marking unit 605 is configured to add, according to the preset disk drop scenario information corresponding to the task type of the test task of the autonomous vehicle, an unclearable mark to the log file in the data queue having data acquisition time consistent with the time of triggering disk drop storage of data.

In some optional implementations of this embodiment, the apparatus for storing autonomous driving test data further includes: a clearing unit (not shown), configured to poll the data and files in the data queue, and clear the message data and the files having no unclearable mark in the data queue.

In some optional implementations of this embodiment, the apparatus for storing autonomous driving test data further includes: an association configuration unit (not shown), configured to send, according to a user's configuration operation of correspondingly associating a preset task type with the preset disk drop scenario information, a corresponding relationship between the preset task type and the preset disk drop scenario information to a cloud for storing; and the second acquiring unit is further configured to: read, from the cloud, the preset disk drop scenario information corresponding to the task type of the test task of the autonomous vehicle.

In some optional implementations of this embodiment, the association configuration unit may further include an information processing module and a preset disk drop scenario information determination module not shown in FIG. 6.

The information processing module is configured to read, according to the preset task type of a preset test task selected by the user, at least one piece of candidate disk drop scenario information that matches the preset task type from the cloud and push the candidate disk drop scenario information to the user; and the preset disk drop scenario information determination module is configured to use the candidate disk drop scenario information selected by the user as the preset disk drop scenario information corresponding to the preset task type.

In some optional implementations of this embodiment, the information processing module further includes: a strategy push submodule (not shown), configured to push a data partitioning strategy to the user, for the user to select the preset task type of the preset test task according to test requirement information of the preset test task and the data required to be acquired for different task types, where the data partitioning strategy includes the message data of the autonomous vehicle required to be acquired under each task type.

According to embodiments of the present disclosure, the present disclosure further provides an electronic device and a readable storage medium.

Figure 7:
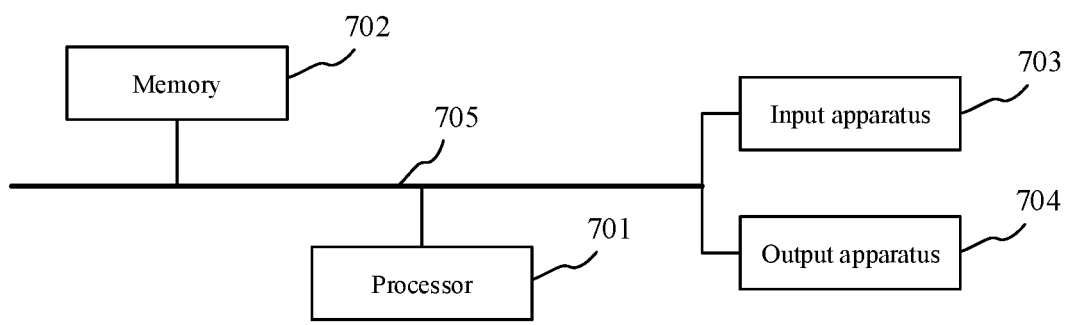
FIG. 7 is a block diagram of an electronic device for implementing the method for storing autonomous driving test data according to embodiments of the present disclosure.

FIG. 7 shows a block diagram of an electronic device for storing autonomous driving test data according to an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital processor, a cellular phone, a smart phone, a wearable device, and other similar computing apparatuses. The components shown herein, their connections and relationships, and their functions are merely examples, and are not intended to limit the implementation of the present disclosure described and/or required herein.

As shown in FIG. 7, the electronic device includes: one or more processors 701, a memory 702, and interfaces for connecting various components, including high-speed interfaces and low-speed interfaces. The various components are connected to each other by bus 705, and can be installed on a common motherboard or installed in other ways as required. The processor may process instructions executed in the electronic device, including instructions stored in or on the memory to display graphical information of a GUI on an external input/output apparatus (such as a display device coupled to an interface). In other implementations, a plurality of processors and/or a plurality of buses may be used with a plurality of memories if necessary. Similarly, a plurality of electronic devices may be connected, and each device provides some necessary operations (for example, as a server array, a group of blade servers, or a multi-processor system). One processor 701 is taken as an example in FIG. 7.

The memory 702 is a non-transitory computer readable storage medium provided by the present disclosure. The memory stores instructions executable by at least one processor, causing the at least one processor to execute the method for storing data according to embodiments of the present disclosure. The non-transitory computer readable storage medium of embodiments of the present disclosure stores computer instructions, and the computer instructions are used for a computer to execute the method for storing data according to embodiments of the present disclosure.

As a non-transitory computer readable storage medium, the memory 702 may be used to store non-transitory software programs, non-transitory computer-executable programs and modules, such as program instructions/modules (for example, the first acquiring unit 601, the receiving unit 603, the writing unit 603, the second acquiring unit 604 and the marking unit 605 shown in FIG. 6) corresponding to the method for storing data according to embodiments of the present disclosure. The processor 701 executes various functional applications and data processing of the server by running the non-transitory software programs, instructions and modules stored in the memory 702, that is, implements the method for storing data according to embodiments of the method.

The memory 702 may include a program storage area and a data storage area, where the program storage area may store an operating system and an application program required by at least one function; and the data storage area may store data created by the electronic device for storing data. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely configured with respect to the processor 701, and these remote memories may be connected to the electronic device for storing data through a network. Examples of the network include, but are not limited to, the Internet, an intranet, a local area network, a mobile communications network, or a combination thereof.

The electronic device for the method for storing autonomous driving test data may further include: an input apparatus 703 and an output apparatus 704. The processor 701, the memory 702, the input apparatus 703, and the output apparatus 704 may be connected by a bus 705 or other means, exemplified by the bus 705 in FIG. 7.

The input apparatus 703 may receive input digital or character information, and generate key signal inputs related to the user settings and function control of the electronic device for storing data, such as a touch screen, a keypad, a mouse, a trackpad, a touchpad, an indicating arm, one or more mouse buttons, a trackball, a joystick and other input apparatuses. The output apparatus 704 may include a display device, an auxiliary lighting apparatus (for example, LED) and a tactile feedback apparatus (for example, a vibration motor). The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and Internet.

The computer system may include a client and a server. The client and the server are generally remote from each other and typically interact through the communication network. The relationship between the client and the server is generated through computer programs running on the respective computers and having a client-server relationship to each other.

According to the technical solutions of embodiments of the present disclosure, the data of the autonomous vehicle can be stored by using the task type of the test task of the autonomous vehicle and the corresponding disk drop scenario information, and useless and repeated data can be cleared, thereby shortening test time and saving disk resources.

It should be understood that the various forms of processes shown above can be used to reorder, add, or delete steps. For example, the steps disclosed in embodiments of the present disclosure can be executed in parallel, sequentially, or in different orders, as long as the desired results of the technical solutions disclosed in embodiments of the present disclosure can be achieved. This is not limited herein.

The above specific implementations do not constitute a limitation to the protection scope of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be included within the protection scope of the present disclosure.

What is claimed is:

1. A method for storing autonomous driving test data, comprising:

sending, according to a user's configuration operation of correspondingly associating a preset task type with preset disk drop scenario information, a corresponding relationship between the preset task type and the preset disk drop scenario information to a cloud for storing;

acquiring a task type of a test task of an autonomous vehicle;

receiving message data acquired in a test of the autonomous vehicle and corresponding to the task type, and writing the message data into a data queue;

creating a log file corresponding to the task type, writing the message data corresponding to the task type in the data queue into the log file, and transferring the log file and a file name of the log file to the data queue;

acquiring the preset disk drop scenario information corresponding to the task type of the test task of the autonomous vehicle, the preset disk drop scenario information representing a time of triggering disk drop storage of data, wherein the acquiring the preset disk drop scenario information corresponding to the task type of the test task of the autonomous vehicle comprises: reading, from the cloud, the preset disk drop scenario information corresponding to the task type of the test task of the autonomous vehicle; and adding, according to the preset disk drop scenario information corresponding to the task type of the test task of the autonomous vehicle, an unclearable mark to the log file in the data queue having data acquisition time consistent with the time of triggering disk drop storage of data.

2. The method according to claim 1, wherein the method further comprises:
   polling the data and files in the data queue, and clearing the message data and the files having no unclearable mark in the data queue.

3. The method according to claim 1, wherein the sending, according to the user's configuration operation of correspondingly associating the preset task type with the preset disk drop scenario information, the corresponding relationship between the preset task type and the preset disk drop scenario information to the cloud for storing comprises:
   reading, according to the preset task type of a preset test task selected by the user, at least one piece of candidate disk drop scenario information that matches the preset task type from the cloud and pushing the candidate disk drop scenario information to the user; and
   using the candidate disk drop scenario information selected by the user as the preset disk drop scenario information corresponding to the preset task type.

4. The method according to claim 3, wherein the method further comprises:
   pushing a data partitioning strategy to the user, for the user to select the preset task type of the preset test task according to test requirement information of the preset test task and the data required to be acquired for different task types, wherein the data partitioning strategy comprises the message data of the autonomous vehicle required to be acquired under each task type.

5. An electronic device, comprising:
   at least one processor; and
   a memory communicatively connected with the at least one processor;
   the memory storing instructions executable by the at least one processor, and the instructions, when executed by the at least one processor, causing the at least one processor to perform operations, the operations comprising:
   sending, according to a user's configuration operation of correspondingly associating a preset task type with preset disk drop scenario information, a corresponding relationship between the preset task type and the preset disk drop scenario information to a cloud for storing;
   acquiring a task type of a test task of an autonomous vehicle;
   receiving message data acquired in a test of the autonomous vehicle and corresponding to the task type, and writing the message data into a data queue;
   creating a log file corresponding to the task type, writing the message data corresponding to the task type in the data queue into the log file, and transferring the log file and a file name of the log file to the data queue;
   acquiring the preset disk drop scenario information corresponding to the task type of the test task of the autonomous vehicle, the preset disk drop scenario information representing a time of triggering disk drop storage of data, wherein the acquiring the preset disk drop scenario information corresponding to the task type of the test task of the autonomous vehicle comprises: reading, from the cloud, the preset disk drop scenario information corresponding to the task type of the test task of the autonomous vehicle; and
   adding, according to the preset disk drop scenario information corresponding to the task type of the test task of the autonomous vehicle, an unclearable mark to the log file in the data queue having data acquisition time consistent with the time of triggering disk drop storage of data.

6. The electronic device according to claim 5, wherein the operations further comprise:
   polling the data and files in the data queue, and clearing the message data and the files having no unclearable mark in the data queue.

7. The electronic device according to claim 5, wherein the sending, according to the user's configuration operation of correspondingly associating the preset task type with the preset disk drop scenario information, the corresponding relationship between the preset task type and the preset disk drop scenario information to the cloud for storing comprises:
   reading, according to the preset task type of a preset test task selected by the user, at least one piece of candidate disk drop scenario information that matches the preset task type from the cloud and pushing the candidate disk drop scenario information to the user; and
   using the candidate disk drop scenario information selected by the user as the preset disk drop scenario information corresponding to the preset task type.

8. The electronic device according to claim 7, wherein the operations further comprise:
   pushing a data partitioning strategy to the user, for the user to select the preset task type of the preset test task according to test requirement information of the preset test task and the data required to be acquired for different task types, wherein the data partitioning strategy comprises the message data of the autonomous vehicle required to be acquired under each task type.

9. A non-transitory computer readable storage medium storing computer instructions, the computer instructions, when executed by a computer, causing the computer to perform operations, the operations comprising:
   sending, according to a user's configuration operation of correspondingly associating a preset task type with preset disk drop scenario information, a corresponding relationship between the preset task type and the preset disk drop scenario information to a cloud for storing;
   acquiring a task type of a test task of an autonomous vehicle;
   receiving message data acquired in a test of the autonomous vehicle and corresponding to the task type, and writing the message data into a data queue;
   creating a log file corresponding to the task type, writing the message data corresponding to the task type in the data queue into the log file, and transferring the log file and a file name of the log file to the data queue;
   acquiring the preset disk drop scenario information corresponding to the task type of the test task of the autonomous vehicle, the preset disk drop scenario information representing a time of triggering disk drop storage of data, wherein the acquiring the preset disk drop scenario information corresponding to the task type of the test task of the autonomous vehicle comprises: reading, from the cloud, the preset disk drop scenario information corresponding to the task type of the test task of the autonomous vehicle; and
   adding, according to the preset disk drop scenario information corresponding to the task type of the test task of the autonomous vehicle, an unclearable mark to the log file in the data queue having data acquisition time consistent with the time of triggering disk drop storage of data.

10. The non-transitory computer readable storage medium according to claim 9, wherein the operations further comprise:
   polling the data and files in the data queue, and clearing the message data and the files having no unclearable mark in the data queue.

11. The non-transitory computer readable storage medium according to claim 9, wherein the sending, according to the user's configuration operation of correspondingly associating the preset task type with the preset disk drop scenario information, the corresponding relationship between the preset task type and the preset disk drop scenario information to the cloud for storing comprises:
   reading, according to the preset task type of a preset test task selected by the user, at least one piece of candidate disk drop scenario information that matches the preset task type from the cloud and pushing the candidate disk drop scenario information to the user; and
   using the candidate disk drop scenario information selected by the user as the preset disk drop scenario information corresponding to the preset task type.

12. The non-transitory computer readable storage medium according to claim 11, wherein the operations further comprise:
   pushing a data partitioning strategy to the user, for the user to select the preset task type of the preset test task according to test requirement information of the preset test task and the data required to be acquired for different task types, wherein the data partitioning strategy comprises the message data of the autonomous vehicle required to be acquired under each task type.

* * * * *